Patented Mar. 24, 1942

2,277,252

UNITED STATES PATENT OFFICE 2,277,252

POLYMERS FROM OIL AND EXTRACT OF THE GENUS COFFEA

Herbert S. Polin, Albert I. Nerken, and Henry Wettingfeld, Jr., New York, N. Y., assignors to Coffee X Corporation, a corporation of Delaware No Drawing. Application August 7, 1940, Serial No. 351,667

6 Claims. (Cl. 260—407)

The present invention relates to new and useful products derived from the oil of the coffee bean or berry from any of the species of the genus "Coffea," and a process for producing said products.

The oil of the coffee berry and bean, obtained by any one of a number of well known solvent or expressing methods, is composed in the main of fatty acid glycerides, sterols and waxes. The glycerides are constituted or oleic, linoleic, palmitic and other fatty acids; the sterols and waxes are, in the main, of undetermined nature and lend unique properties to the oil and products derived therefrom. The present invention relates to the production of high molecular weight condensation compounds derived from, and employing all or select portions of, the coffee oil. The condensation products may vary in character from viscous liquids through rubbery solids to completely hard masses. The properties of the product obtained depend on the proportions of reacting and compounding materials used and upon the conditions of temperature and pressure maintained during the reaction periods, as well as upon the specific catalysts employed, as hereinafter disclosed.

The first step in the process consists of reacting the oil with such active agents as bromine or chlorine, the agents being in the elemental state, or dissolved in suitable solvents, or derived from hypoacids or from any other suitable source. The active agents employed in this first step are any agents that will combine with the oil and be susceptible of later replacement with such a group as the hydroxyl group, OH. The proportions of the groups employed will depend on the properties desired in the ultimate product. The complete action of such an agent as bromine is unknown, but, in part, it consists in joining itself to the unsaturated fatty acids of the glycerides at the point of unsaturation. This addition occurs on direct contact of the bromine (chlorine etc.) with the oil; in fact, it may be desirable to cool the mixture while adding the reagents, to remove the heat of the reaction and control its course.

Having introduced active groups as above, the process may take one of several courses.

In one proceedure, a quantity of NaOH solution of proper strength, either greater or less than the amount necessary to saponify the oil, depending on the desired end product, is added to the brominated (chlorinated, etc.) oil. The mass is agitated, and under the influence of heat and pressure with simultaneous removal of water and other volatile gases of reaction by any suitable means, undergoes a complex of reactions. The end result of the reactions is a highly condensed product of resinous or rubbery character, depending on the factors mentioned above.

The chemistry of the coffee oil being only imperfectly known, the exact course of the above reactions can not be specifically stated. It is probable, however, that under the conditions specified, the oil is first saponified and/or hydrolysed. There is then present a mixture which may contain unalterated brominated (or chlorinated, etc.) oil, partially or fully saponified brominated oil, glycerine, brominated and unbrominated soaps and fatty acids. Under the further action of heat, and with the removal of water, a complex esterification probably then ensues. The soaps may esterify either with one another, splitting off NaBr, or with glycerine or the partially saponified oil, splitting off HBr. Since each soap molecule derived from an unsaturated acid has at least two active groups (bromine or chlorine etc.) in its structure, the esterification proceeds to form high molecular weight condensation products. This may be illustrated as follows:

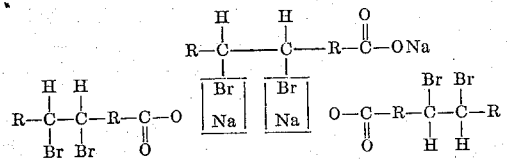

Similarly, the brominated soaps or fatty acids or other polybrominated compounds may esterify with glycerine molecules to produce high molecular weight products. In general, any of the molecules present having two or more active groups may partake in this condensation. Other reactions of unknown character also occur, the end result being a unique product. The properties of the product may be varied by controlling the initial saponification and hydrolysis and the temperature and pressure maintained during the latter part of the reaction. By controlling the initial saponification, some of the saturated acids remain linked to the partially hydrolysed glyceride molecules. In this way the saturated acids tend to appear in the final product. Free saturated soaps or acids will tend to break the condensation chain and by controlling the amount of these, the physical properties of the condensation product can be varied.

The above description does not claim to be a full one of the possible reactions; it only attempts to give one of several possible mechanisms which may explain the result. For instance, conditions may favor hydroxylation of the fatty acids at the bromine atoms. This would not invalidate the general explanation given above.

In an alternative procedure, the brominated oil is mixed with water and a small percentage of an alkaline catalyst such as Ca(OH)$_2$ or Mg(OH)$_2$. The mixture is heated under pressure until hydrolysis has proceeded to a predetermined stage, indicated by the desired end product. The heating is then continued with simultaneous removal of water, resulting in a resinous or rubbery product. The reactions are probably similar to those outlined above.

In a third procedure, the brominated oil is carefully treated with NaOH or water, as in the previous procedures, the reaction being terminated after hydrolysis has set in. The mixture is then treated with a condensing agent such as AlCl$_3$, resulting in a resinous or rubbery product.

In another procedure, the brominated oil, after controlled hydrolysis, is mixed with an acid, such as phthalic acid or preferably, phthalic anhydride. The acid or anhydride may be used in the solid state; or a suitable solvent may be employed. On heating the mixture at an elevated temperature, preferably with removal of water, a resinous product is produced. The physical properties of the product will depend on the amount of bromination and hydrolysis, the quantity of acid or anhydride employed and the temperature maintained during the reaction. It has also been found that the type of solvent used to dissolve the reaction mixture, influences the course of the condensation and the end product. Acids or acidic catalysts promote the reaction considerably, and affect the properties of the resinous or rubbery product obtained. While phthalic acid has been specified, other polybasic acids, such as malonic acid, also can be employed to yield useful products. The reactions here also involve an esterification as previously described.

In another procedure, after the oil has been brominated or (chlorinated, etc.) and hydrolised, under controlled conditions, an aldehyde, such as formaldehyde is added thereto, whereupon a condensation takes place readily, particularly in the presence of a catalyst such as dry HCl. The choice of aldehyde is not limited to formaldehyde but may include acrolein, furfural, etc., many of these aldehydes being derivable from the coffee berry or bean or oil.

In all the above procedures, polybasic acids or hydroxy acids may be added to the reaction mixtures to yield condensation products of a wide range of properties.

The products obtained my be employed in any one or more of the preparations for which synthetic resins have been found suitable, for instance, as paint vehicles, as part of mastic preparations or in molding compositions.

Having thus described our invention what we claim for Letters Patent is:

1. Process for polymerizing oil extracted from the genus Coffea which comprises the steps of: halogenating said oil, and thereafter treating with a polymerizing agent selected from the group consisting of alkalies, polybasic acids, and aldehydes.

2. Process for polymerizing oil extracted from the genus Coffea, which comprises halogenating said oil, and thereafter polymerizing by treatment with an alkali.

3. Process for polymerizing oil extracted from the genus Coffea, which comprises: halogenating said oil, and thereafter polymerizing by treating with an alkali under heat and pressure.

4. Process for polymerizing oil extracted from the genus Coffea, which comprises: halogenating said oil, treating the resulting product with an alkali, and thereafter treating with a polymerizing catalyst.

5. Process for polymerizing oil extracted from the genus Coffea, which comprises: halogenating and thereafter hydrolyzing said oil, and treating with a polybasic acid.

6. Process for ploymerizing oil extracted from the genus Coffea, which comprises: halogenating and thereafter hydrolyzing said oil, and treating with an aldehyde in the presence of a polymerizing catalyst.

HERBERT S. POLIN.
ALBERT I. NERKEN.
HENRY WETTINGFELD, JR.